US011797242B2

(12) United States Patent
Takahashi

(10) Patent No.: US 11,797,242 B2
(45) Date of Patent: Oct. 24, 2023

(54) COMPUTER-READABLE STORAGE MEDIUM, ADMINISTRATION METHOD, AND ADMINISTRATION SYSTEM

(71) Applicant: BROTHER KOGYO KABUSHIKI KAISHA, Nagoya (JP)

(72) Inventor: Eriko Takahashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/736,493

(22) Filed: May 4, 2022

(65) Prior Publication Data
US 2022/0413777 A1    Dec. 29, 2022

(30) Foreign Application Priority Data

Jun. 29, 2021  (JP) ................................ 2021-107647

(51) Int. Cl.
*G06F 3/12* (2006.01)
*H04L 67/125* (2022.01)
(52) U.S. Cl.
CPC .......... *G06F 3/1231* (2013.01); *G06F 3/1204* (2013.01); *H04L 67/125* (2013.01)
(58) Field of Classification Search
None
See application file for complete search history.

(56) References Cited

U.S. PATENT DOCUMENTS

| 2006/0122848 A1* | 6/2006 | Takagi | G06F 9/4411 709/221 |
| 2008/0016196 A1* | 1/2008 | MacMillan | H04L 67/125 709/223 |
| 2021/0374107 A1* | 12/2021 | Kamo | G06F 16/1844 |

FOREIGN PATENT DOCUMENTS

| JP | 2004-171513 A | 6/2004 |
| JP | 2004-213132 A | 7/2004 |

* cited by examiner

*Primary Examiner* — Frantz Bataille
(74) *Attorney, Agent, or Firm* — Baker Botts L.L.P.

(57) ABSTRACT

A non-transitory computer readable storage medium storing computer readable instructions that are executable by a computer in an administration system, is provided. The administration system has a client device, an administration device including the computer, a device configured to operate based on commands from the client device, and a storage configured to store a plurality of units of user information concerning a user of the client device. The computer readable instructions, when executed by the computer, cause the computer to acquire device designating information being a designated one of units of device information set to the device from the device, acquire user designating information being a designated one of the units of user information set to the user from the storage, and reflect the acquired device designating information and the acquired user designating information in a distributing file to be delivered to the client device of the user.

6 Claims, 11 Drawing Sheets

```
Model Name=MFP-0000NW;

[Network Settings]
IP Address=#●●●#;
    ⋮
[Scan Settings]
Default Size=Auto;
Default Color Setting=Mono;
Scan to Server Url=#◆◆◆#;
    ⋮
[Print Settings]
Default Paper Tray=Tray 1;
Default Color Setting=Mono;
    ⋮
```

W2, R11

B11 — Save    Cancel — B12

W4

| Account Acquisition Data Setting | |
|---|---|
| Account data | Acquisition key setting |
| Account name | |
| ADID | |
| Mail address | |
| Data server | #◆◆◆# |
| ⋮ | ⋮ |
| ⋮ | ⋮ |

R31

B31 — Save    Cancel — B32

W5

| Device Data Acquisition Setting | |
|---|---|
| Device data | Acquisition key setting |
| Model name | |
| Language setting | |
| Firmware version | |
| ⋮ | ⋮ |
| IP address | #●●●# |
| Subnet mask | |

R41

B41 — Save    Cancel — B42

Edit distributing file

C:\\*\\*\\settings_0405.csv  R61

```
Model Name=MFP-0000NW;

[Network Settings]
IP Address=#●●●#;
  :
[Scan Settings]
Default Size=Auto;
Default Color Setting=Mono;
Scan to Server Url=#◆◆◆#;
  :
[Print Settings]
Default Paper Tray=Tray 1;
Default Color Setting=Mono;
  :
```

Select file...

Account Acquisition Data Setting   R62

| Account data | Acquisition key setting |
|---|---|
| Account name | |
| ADID | |
| Mail address | |
| Data server | #◆◆◆# |
| : | |
| : | |
| : | |

Device Data Acquisition Setting   R63

| Device data | Acquisition key setting |
|---|---|
| Model name | |
| Language setting | |
| Firmware version | |
| : | |
| IP address | #●●# |
| Subnet mask | |

Select account...    Create    Cancel

W7

ND ADMINISTRATION SYSTEM

COMPUTER-READABLE STORAGE MEDIUM, ADMINISTRATION METHOD, AND ADMINISTRATION SYSTEM

CROSS REFERENCE TO RELATED APPLICATIONS

This application claims priority under 35 U.S.C. § 119 from Japanese Patent Application No. 2021-107647, filed on Jun. 29, 2021, the entire subject matter of which is incorporated herein by reference.

BACKGROUND

The present disclosure is related to a technique for administrating client devices.

An administration device that may search for networking devices connected to a network within a predetermine networking range is known. The networking devices may be administrated through client devices connected to the network, and the administration device may distribute controlling data and programs for controlling the networking devices in a batch to the client devices.

SUMMARY

Contents of the data to be distributed to the client devices for controlling the networking devices may vary depending on users who may use the client devices and peripheral networking devices, e.g., printers, connected to the client devices. Therefore, an administrator who administrates a large number of client devices may need to prepare multiple versions of distributing data suitable to each of the client devices, and preparation for the multiple versions may be a burden on the administrator.

The present disclosure is advantageous in that a technique to improve efficiency to prepare distributing data is provided.

According to an aspect of the present disclosure, a non-transitory computer readable storage medium storing computer readable instructions that are executable by a computer in an administration system is provided. The administration system includes a client device, an administration device configured to administrate the client device and has the computer, a device configured to operate based on commands from the client device, and a storage configured to store a plurality of units of user information concerning a user of the client device. The computer readable instructions, when executed by the computer, cause the computer to acquire device designating information being a designated one of a plurality of units of device information set to the device from the device, acquire user designating information being a designated one of the plurality of units of user information set to the user from the storage, and reflect the acquired device designating information and the acquired user designating information in a distributing file to be delivered to the client device of the user.

According to another aspect of the present disclosure, a method to be implemented by an administration device in an administration system is provided. The administration system includes a client device, the administration device configured to administrate the client device, a device configured to operate based on commands from the client device, and a storage configured to store a plurality of units of user information concerning a user of the client device. The method includes acquiring device designating information being a designated one of a plurality of units of device information set to the device from the device, acquiring user designating information being a designated one of the plurality of units of user information set to the user from the storage, and reflecting the acquired device designating information and the acquired user designating information in a distributing file to be delivered to the client device of the user.

According to another aspect of the present disclosure, an administration system, including a client device, an administration device configured to administrate the client device, a device configured to operate based on commands from the client device, and a storage configured to store a plurality of units of user information concerning a user of the client device, is provided. The administration device is configured to acquire device designating information being a designated one of a plurality of units of device information set to the device from the device, acquire user designating information being a designated one of the plurality of units of user information set to the user from the storage, and reflect the acquired device designating information and the acquired user designating information in a distributing file to be delivered to the client device of the user.

According to another aspect of the present disclosure, a method to be implemented in an administration system, including a client device, an administration device configured to administrate the client device, a device configured to operate based on commands from the client device, and a storage configured to store a plurality of units of user information concerning a user of the client device, is provided. The method includes causing the administration device to acquire device designating information being a designated one of a plurality of units of device information set to the device from the device, causing the administration device to acquire user designating information being a designated one of the plurality of units of user information set to the user from the storage, and causing the administration device to reflect the acquired device designating information and the acquired user designating information in a distributing file to be delivered to the client device of the user.

BRIEF DESCRIPTION OF THE DRAWINGS

FIG. 9 illustrates a selected-file editing window, an account-data setting window, and a device-data setting window according to the embodiment of the present disclosure.

FIG. 10 illustrates an account-selecting window and an account-printer link setting window according to the embodiment of the present disclosure.

FIG. 11 illustrates an edit-setting window according to the embodiment of the present disclosure.

DETAILED DESCRIPTION

In the following paragraphs, with reference to the accompanying drawings, the embodiment of the present disclosure will be described. It is noted that various connections may be set forth between elements in the following description. These connections in general and, unless specified otherwise, may be direct or indirect and that this specification is not intended to be limiting in this respect.

(1) Configuration of Administration System 1

Figure 1:
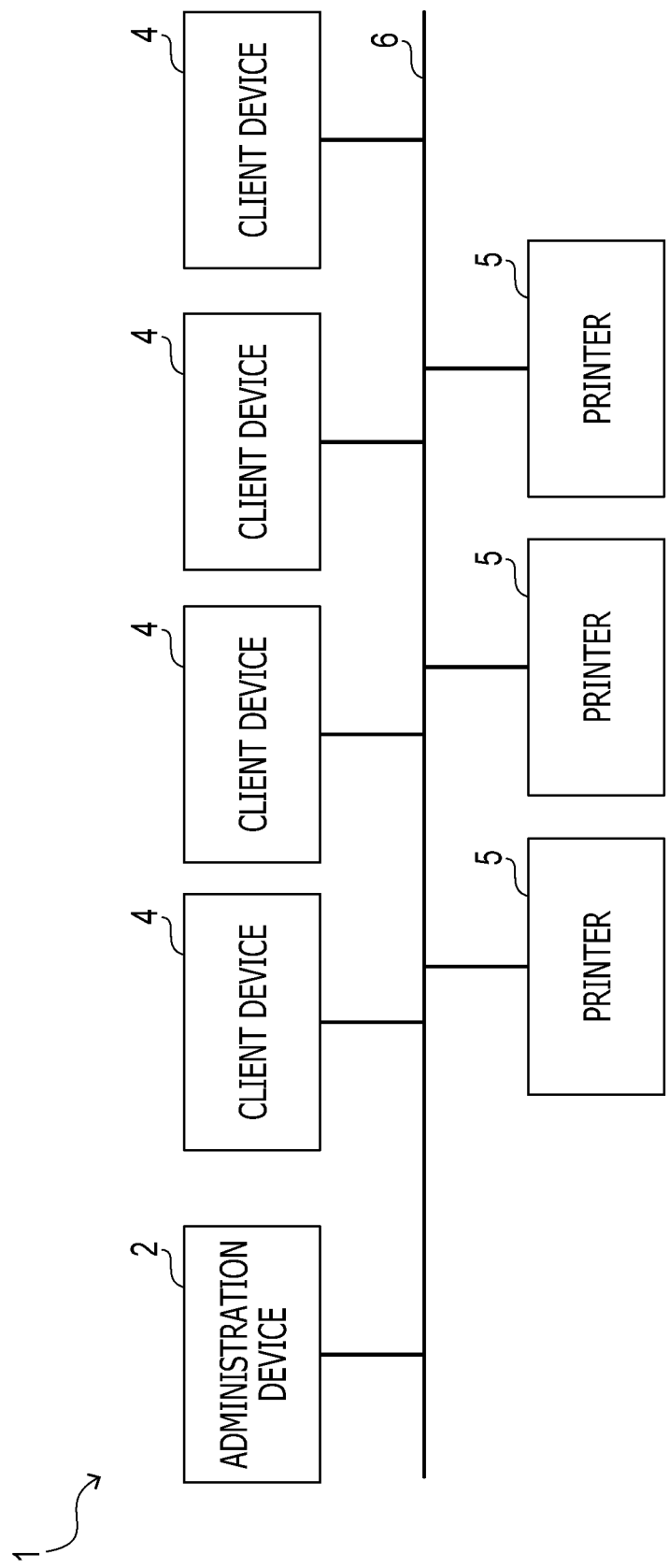
FIG. 1 is an illustrative view of an administration system according to an embodiment of the present disclosure.

An administration system 1 in the present embodiment is a system capable of administrating one or more client devices 4 that may be used in a corporation consisting of a plurality of departments. The administration system 1 in the present embodiment includes an administration device 2, a plurality of client devices 4, and one or more printers 5, as shown in FIG. 1. The administration device 2, the client devices 4, and the printer 5 may communicate with each other through a network such as a local area network (LAN) 6. However, the network connecting the administration device 2 with the client devices 4 and the printers 5 may not necessarily be limited to a LAN but may be a wide area network (WAN) or a combination of LAN(s) and WAN(s).

Figure 2:
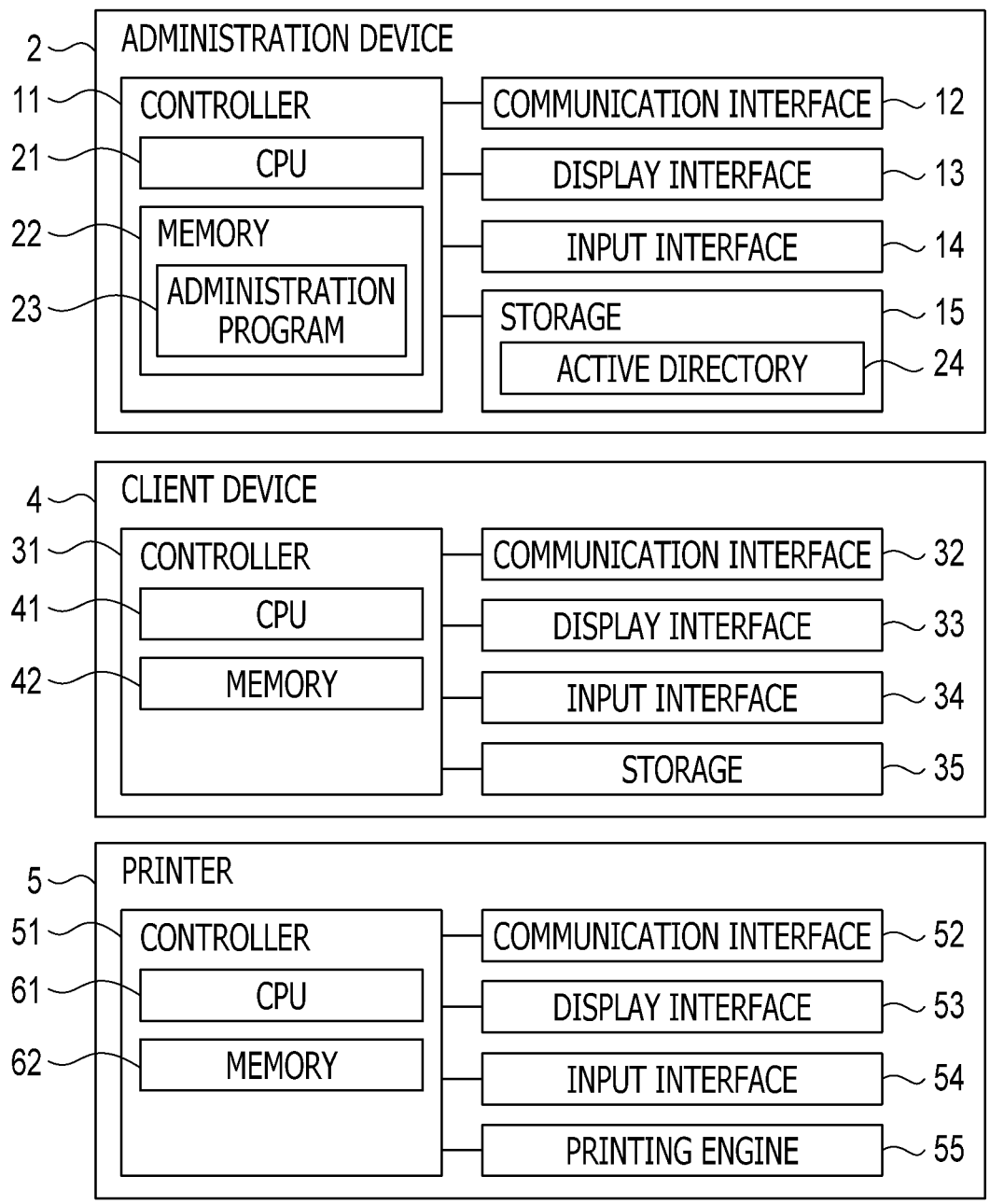
FIG. 2 shows block diagrams to illustrate configurations of an administration device, a client device, and a printer in the administration system according to the embodiment of the present disclosure.

The administration device 2 may be a personal computer having a controller 11, a communication interface 12, a display interface 13, an input interface 14, and a storage 15, as shown in FIG. 2. The controller 11 includes a CPU 21 and a memory 22. The CPU 21 may execute programs stored in the memory 22, and thereby functions of the administration device 2 may be implemented. However, the functions that may be implemented by the controller 11 may not necessarily be implemented by running the programs but may be optionally implemented partly or entirely by one or more hardware device(s).

The memory 22 includes a semiconductor memory, e.g., ROM, RAM, and flash memory. The memory 22 may store an administration program 23. The communication interface 12 enables data communication with the client devices 4 and the printers 5 through the LAN 6.

The display interface 13 includes a displaying device (not shown), which may display images. The input interface 14 includes a keyboard and a mouse. The input interface 14 may output input-operation information, which identifies operations entered through the keyboard and/or the mouse by a user, i.e., an administrator.

The storage 15 includes an auxiliary storage device to store data such as hard disk drive (HDD) and solid state drive (SDD). The storage 15 includes an active directory 24. The active directory 24 has a function to generally administrate identifying information and authenticating information of the client devices 4 and the printers 5, which are administrated by the administration system 1, identifying information and authenticating information of members who belong to a department in the corporation, and the members' access rights to the client devices 4 and to the printers 5.

The client devices 4 may be personal computers. Each client device 5 has a controller 31, a communication interface 32, a display interface 33, an input interface 34, and a storage 35. The client devices 4 may include portable terminals such as smartphones and tablet computers.

The controller 31 includes a CPU 41 and a memory 42. The CPU 41 may execute programs stored in the memory 42, and thereby functions of the client device 4 may be implemented. The functions that may be implemented by the controller 31 may not necessarily be implemented by running the programs but may be optionally implemented partly or entirely by one or more hardware device(s).

The memory 42 includes a semiconductor memory, e.g., ROM, RAM, and flash memory. The communication interface 32 enables data communication with the administration device 2 and the printers 5 through the LAN 6.

The display interface 33 includes a displaying device, which is not shown, to display images. The input interface 34 includes a keyboard and a mouse. The input interface 44 may output input-operation information, which identifies operations entered through the keyboard and/or the mouse by a user of the client device 4.

The storage 35 includes an auxiliary storage device such as HDD and SDD to store data.

Each of the printers 5 has a controller 51, a communication interface, a display interface 53, an input interface 54, and a printing engine 55.

The controller 51 includes a CPU 61 and a memory 62. The CPU 61 may execute programs stored in the memory 62, and thereby functions of the printer 5 may be implemented. The functions that may be implemented by the controller 51 may not necessarily be implemented by running the programs but may be optionally implemented partly or entirely by one or more hardware device(s). The memory 62 includes a semiconductor memory, e.g., ROM, RAM, and flash memory, and stores programs and data.

The communication interface 52 enables data communication with the administration device 2 and the client devices 4 through the LAN 6. The display interface 53 includes a displaying device, which is not shown, to display images. The input interface 54 includes a touch panel arranged on a screen of the display interface 53 and switches arranged in vicinity to the screen of the display interface 53. The input interface 54 may output input-operation information, which identifies operations entered through the touch panel and the switches by a user of the printer 5.

The printing engine 55 has a printing mechanism in, for example, an inkjet style or an electro-photographic style to print images on printing media. Optionally, the printing engine 55 may have a printing mechanism in a thermal-printing style.

(2) Processes to be Conducted in Administration Device 2

Next, a procedure in a client-administrating process to be conducted by the controller 11 of the administration device 2 will be described. The client-administrating process may be executed by an operation from the administrator input through the input interface 14 to activate the administration program 23 stored in the memory 22. The processes described below will involve data communication among the administration device 2, the client devices 4, and the printers 5, which may be exchanged through the LAN 6.

Figure 3:
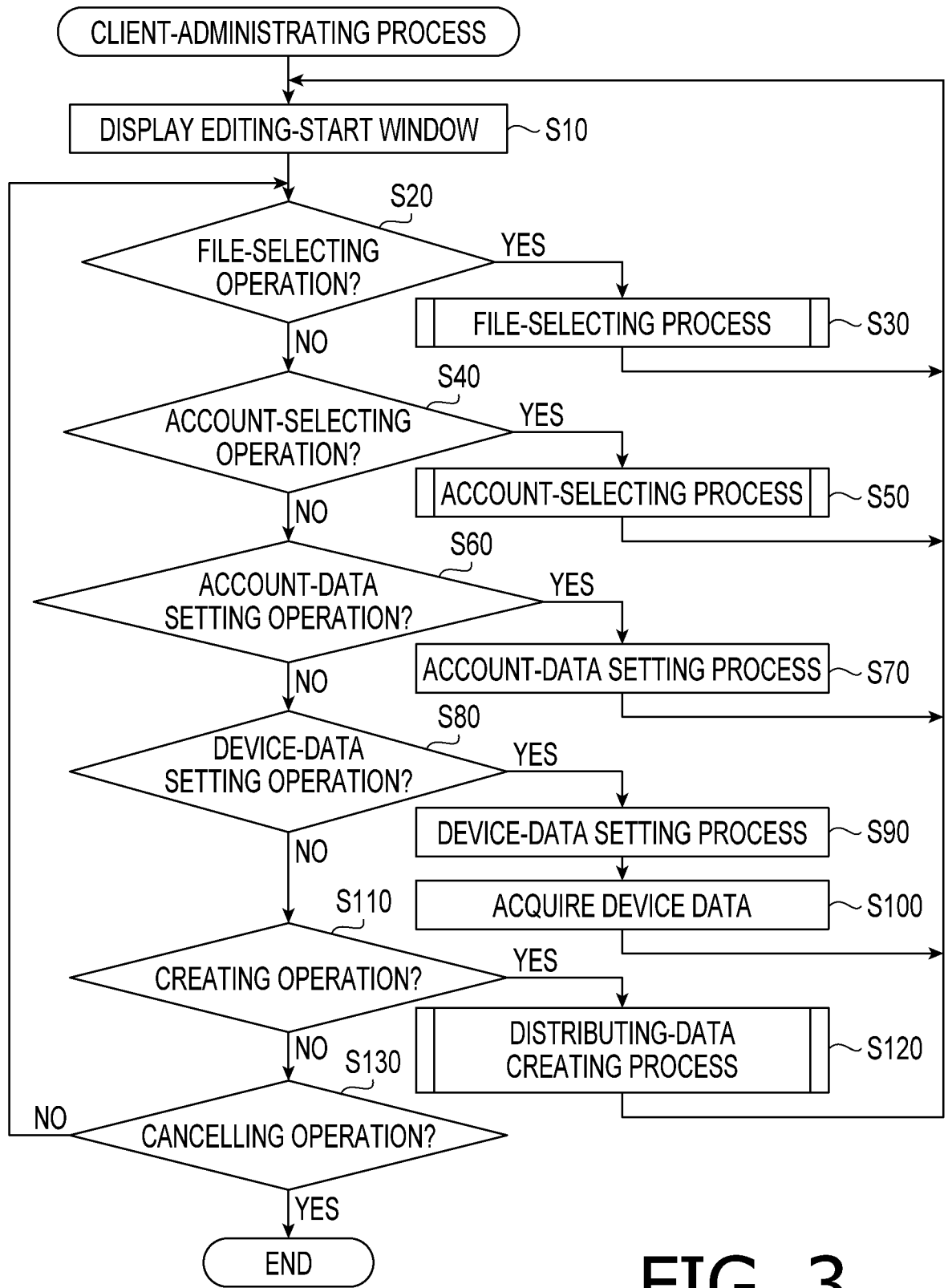
FIG. 3 is a flowchart to illustrate a flow of steps to be conducted in a client-administrating process according to the embodiment of the present disclosure.
Figure 8:
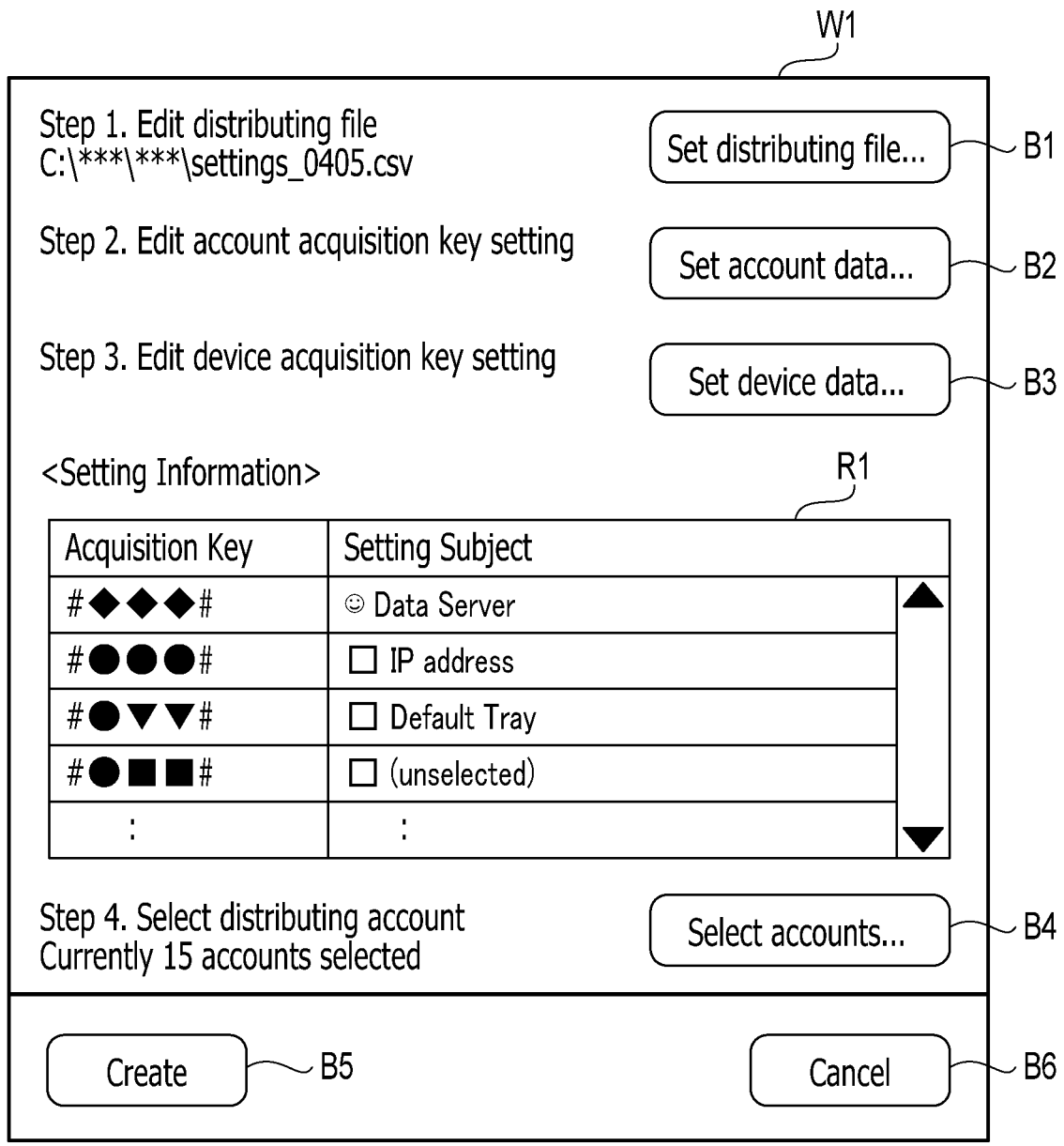
FIG. 8 illustrates an editing-start window according to the embodiment of the present disclosure.

As the client-administrating process starts, as shown in FIG. 3, in S10, the CPU 21 in the controller 11 displays an editing-start window W1 in the screen of the display interface 13. The editing-start window W1 includes, as shown in FIG. 8, a distributing-file setting button B1, an account-data setting button B2, a device-data setting button B3, an account-selecting button B4, a create button B5, a cancel button B6, and a setting information display area R1.

The setting information display area R1 is an area, in which acquisition keys are listed, and each of the acquisition keys is linked with a unit of account data or device data. Following S10, in S20, as shown in FIG. 3, the CPU 21 determines whether a file-selecting operation is entered. In particular, the CPU 21 may determine whether a clicking operation to the distributing-file setting button B1 is entered through the mouse. If the file-selecting operation is entered, in S30, the CPU 21 conducts a file-selecting process, which will be described further below, and returns to S10.

If, on the other hand, no file-selecting operation is entered, in S40, the CPU 21 determines whether an account-selecting operation is entered. In particular, the CPU 21 may determine whether a clicking operation to the account-selecting button B4 is entered through the mouse. If the account-selecting operation is entered, in S50, the CPU 21 conducts an account-selecting process, which will be described further below, and returns to S10.

If, on the other hand, no account-selecting operation is entered, in S60, the CPU 21 determines whether an account-data setting operation is entered. In particular, the CPU 21 may determine whether a clicking operation to the account-data setting button B2 is entered through the mouse. If the account-selecting operation is entered, in S70, the CPU 21 conducts an account-data setting process, which will be described further below, and returns to S10.

If, on the other hand, no account-data setting operation is entered, in S80, the CPU 21 determines whether a device-data setting operation is entered. In particular, the CPU 21 may determine whether an clicking operation to the device-data setting button B3 is entered through the mouse. If the device-data setting operation is entered, in S90, the CPU 21 conducts a device-data setting process, which will be described further below. Thereafter, in S100, the CPU 21 acquires device data, as will be described further below, and returns to S10.

If, on the other hand, no device-data setting operation is entered, in S110, the CPU 21 determines whether a creating operation is entered. In particular, the CPU 21 may determine whether a clicking operation to the create button B5 is entered through the mouse. If the creating operation is entered, in S120, the CPU 21 conducts a distributing-data creating process, which will be described further below, and returns to S10.

If, on the other hand, no creating operation is entered, in S130, the CPU 21 determines whether a cancelling operation is entered. In particular, the CPU 21 may determine whether a clicking operation to the cancel button B6 is entered through the mouse. If no cancelling operation is entered, the CPU 21 returns to S20. If, on the other hand, the cancelling operation is entered, the CPU 21 ends the client-administrating process.

Figure 4:
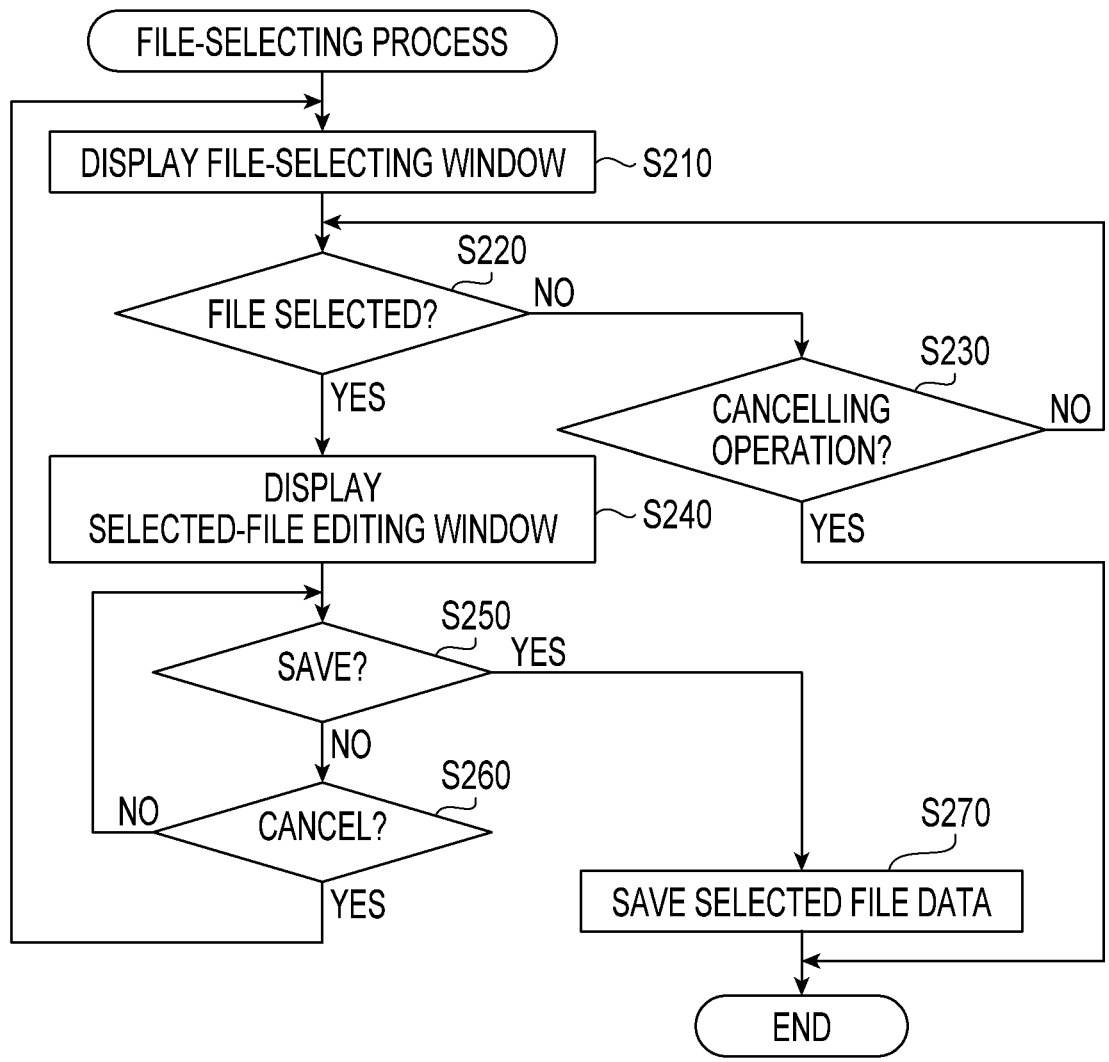
FIG. 4 is a flowchart to illustrate a flow of steps to be conducted in a file-selecting process according to the embodiment of the present disclosure.

Next, the file-selecting process in S30 will be described in detail. As the file-selecting process starts, in S210, as shown in FIG. 4, the CPU 21 displays a file-selecting window in the screen of the display interface 13. The file-selecting window is presented as a field, in which one or more distributing files is displayed, and one of the one or more distributing files is selectable to the administrator with an operation input through the keyboard and/or the mouse.

In S220, the CPU 21 determines whether one of the at least one distributing file is selected. In particular, the CPU 21 may determine whether input-operation information indicating the distributing file selected through the file-selecting window is input through the input interface 14. If the input-operation information indicating the selected distributing file is input through the input interface 14, the CPU 21 may determine that the distributing file is selected.

If, on the other hand, none of the distributing file is selected, in S230, the CPU 21 determines whether a cancelling operation is entered. In particular, the CPU 21 may determine whether a clicking operation to a cancel button provided in the file-selecting window is entered through the mouse. If no cancelling operation is entered, the CPU 21 proceeds to S220. If, on the other hand, the cancelling operation is entered, the CPU 21 ends the file-selecting process.

If at least one distributing file is selected, in S240, the CPU 21 reads the selected distributing file from the active directory 24 and displays the selected-file editing window W2 in the screen of the display interface 13.

The selected-file editing window W2 includes, as shown in FIG. 9, a distributing-file editing area R11, a save button B11, and a cancel button B12. The distributing-file editing area R11 is presented as a field, in which contents of the selected distributing file are displayed, and through which the user is allowed to edit the contents.

A text string "Model Name=MFP-0000NW;" in the distributing-file editing area R11 shown in FIG. 9 indicates that a name of a model corresponding to the selected distributing file is "MFP-0000NW."

The distributing-file editing area R11 displays setting categories [Network Settings], [Scan Settings], and [Print Settings], as shown in FIG. 9. The setting category [Network Settings] includes "IP address" which is one of items to be set by the administrator.

The setting category [Scan Settings] includes items to be set: "Default Size," "Default Color Setting," and "Scan to Server Url."

The setting category [Print Settings] includes items to be set: "Default Paper Tray" and "Default Color Setting."

The text string "IP Address=#●●●#;" displayed in the distributing-file editing area R11 indicates that the IP address is set to a value associated with an acquisition key # ●●●#, which will be described further below.

The text string "Default Size=Auto;" displayed in the distributing-file editing area R11 indicates that a default size is set to automatic. The text string "Default Color Setting=Mono;" displayed in the distributing-file editing area R11 indicates that a default color setting is monochrome.

The text string "Scan to Server Url=# ♦♦♦#;" displayed in the distributing-file editing area R11 indicates that a scan-saving server URL is set to a value associated with an acquisition key #♦♦♦#, which will be described further below.

The text string "Default Paper Tray=Tray 1;" displayed in the distributing-file editing area R11 indicates that a default paper tray is set to a first tray.

Next, in S250, as shown in FIG. 4, the CPU 21 determines whether a clicking operation to the save button B11 is entered. If no clicking operation to the save button B11 is entered, in S260, the CPU 21 determines whether a clicking operation to the cancel button B12 is entered.

If the clicking operation to the cancel button B12 is entered, the CPU 21 returns to S210. If, on the other hand, no clicking operation to the cancel button B12 is entered, the CPU 21 returns to S250.

Meanwhile, in S250, if the clicking operation to the save button B11 is entered, in S270, the CPU 21 overwrites the selected distributing file in the active directory 24 with the contents displayed in the distributing-file editing area R11 and ends the file-selecting process.

Figure 5:
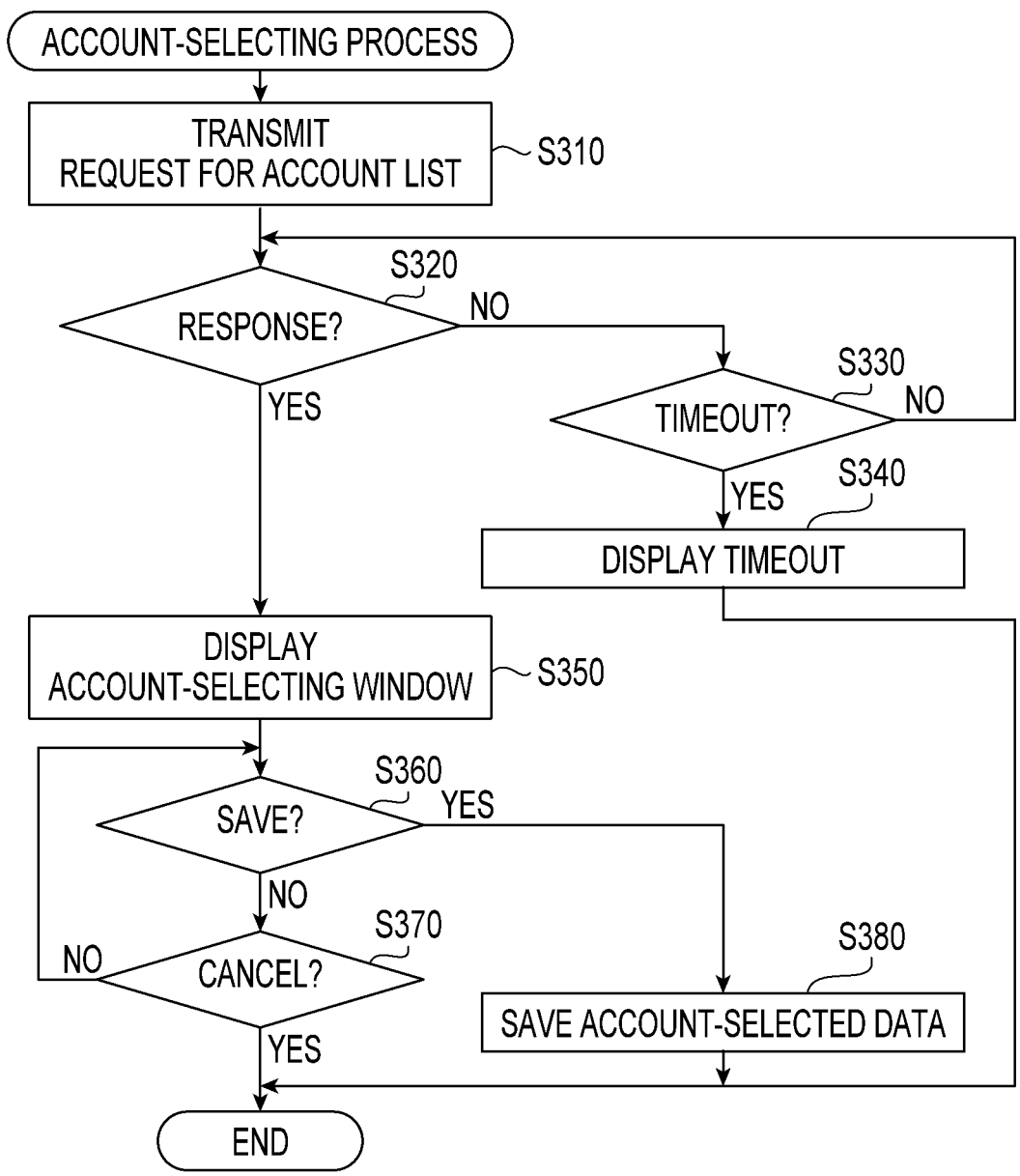
FIG. 5 is a flowchart to illustrate a flow of steps to be conducted in an account-selecting process according to the embodiment of the present disclosure.

Next, the account-selecting process in S50 will be described in detail. As the account-selecting process starts, in S310, as shown in FIG. 5, the CPU 21 transmits a request for an account list to the active directory 24.

In S320, the CPU 21 determines whether a response from the active directory 24 is received. In particular, the CPU 21 may determine whether the account list is received from the active directory 24. In other words, the CPU 21 may determine that the response from the active directory 24 is received when the account list is received from the active directory 24.

If no response was received from the active directory 24, in S330, the CPU 21 determines whether a timeout period elapsed. In particular, the CPU 21 may determine that the timeout period elapsed when a predetermined length of time passed since the transmission of the request to the active directory 24 in S310.

If the timeout period has not elapsed, the CPU 21 returns to S320. If, on the other hand, the timeout period elapsed, the CPU 21 displays a message indicating the timeout in the screen of the display interface 13 and ends the account-selecting process.

Meanwhile, in S320, if the response from the active directory 24 was received, in S350, the CPU 21 displays the account-selecting window W3 based on the account list received from the active directory 24 in the screen of the display interface 13.

Figure 10:
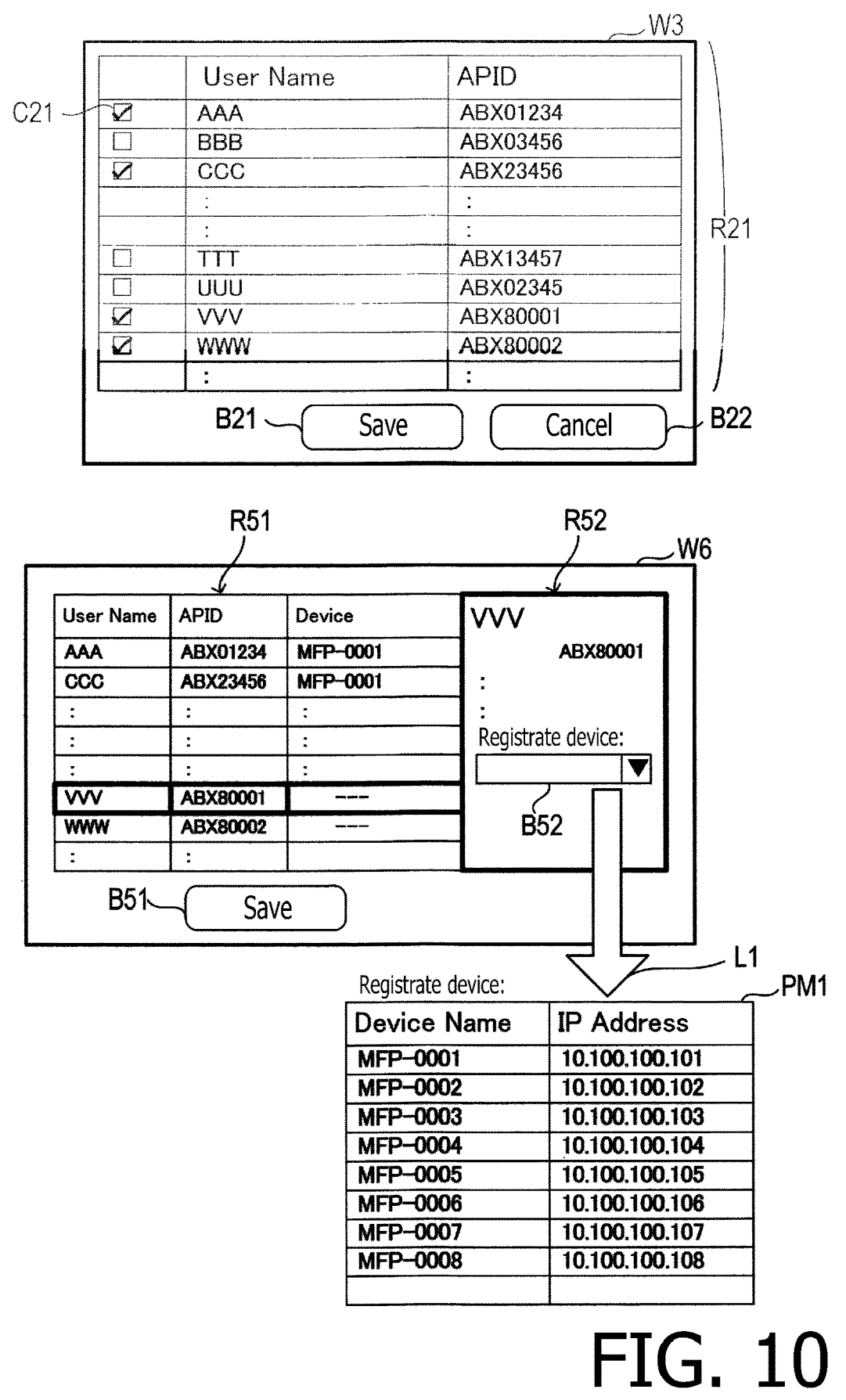

The account-selecting window W3 includes, as shown in FIG. 10, an account-selecting area R21, a save button B21, and a cancel button B22. The account-selecting area R21 displays the plurality of members belonging to the department of the corporation, in association with respective names and account names assigned thereto. Moreover, in the account-selecting area R21, a checkbox C21 is provided to each of the members. Placing a checkmark in the checkbox C21 equates to selecting the account corresponding to the checkbox C21. For example, in the account-selecting window W3 shown in FIG. 10, accounts of the members whose names are AAA, CCC, VVV, and WWW are selected.

In S360, the CPU 21 determines whether a clicking operation to the save button B21 is entered. If no clicking operation on the save button B21 is entered, in S370, the CPU 21 determines whether a clicking operation to the cancel button B22 is entered. If the clicking operation to the cancel button B22 is entered, the CPU 21 ends the account-selecting process. If, on the other hand, no clicking operation to the cancel button B22 is entered, the CPU 21 returns to S360.

Meanwhile, in S360, if the clicking operation to the save button B21 is entered, in S380, the CPU 21 creates selected-account data indicating the account(s) selected through the account-selecting window W3 and saves the selected-account data in the active directory 24. Thereafter, the CPU 21 ends the account-selecting process.

Next, the account-data setting process in S70 will be described in detail. As the account-data setting process starts, the CPU 21 displays an account-data setting window W4 in the screen of the display interface 13.

The account-data setting window W4 includes, as shown in FIG. 9, an acquisition key setting area R31, a save button B31, and a cancel button B32. The acquisition key setting area R31 is presented as a field, through which an acquisition key may be set to each one of a plurality of units of account data. The account-data setting window W4 shown in FIG. 9 displays the plurality of units of account data, which are "Account name," "ADID," "Mail address," and a "Data server." The account-data setting window W4 in FIG. 9 shows a case where an acquisition key identified by a text string #♦ ♦ ♦# is being set to "Data server," which is one of the plurality of units of account data.

When a clicking operation to the save button B31 is entered, based on the contents currently displayed in the account-data setting window W4, the CPU 21 creates account-setting item data indicating a link between the unit of account data, to which the acquisition key is set, and the content of the acquisition key. The CPU 21 saves the created account-setting item data in the active directory 24 and ends the account-data setting process.

Alternatively, if a clicking operation to the cancel button B32 is entered, the CPU 21 ends the account-data setting process without creating the account-setting item data.

Next, the device-data setting process in S90 will be described in detail. As the device-data setting process starts, the CPU 21 displays a device-data setting window W5 in the screen of the display interface 13.

The device-data setting window W5 includes, as shown in FIG. 9, an acquisition key setting area R41, a save button B41, and a cancel button B42. The acquisition key setting area R41 is presented as a field, through which an acquisition key may be set to each one of a plurality of units of device data. The device-data setting window W5 shown in FIG. 9 displays the plurality of units of device data, which are "Model name," "Language setting," "Firmware version," "IP address," and "Subnet mask." The device-data setting window W5 in FIG. 9 shows a case where an acquisition key identified by a text string # ●●●# is being set to "IP address," which is one of the plurality of units of device data.

When a clicking operation to the save button B41 is entered, based on the contents currently displayed in the device-data setting window W5, the CPU 21 creates device-setting item data indicating a link between the device data, in which the acquisition key is set, and the content of the acquisition key. The CPU 21 saves the created device-setting item data in the active directory 24 and ends the device-data setting process.

Alternatively, if a clicking operation to the cancel button B42 is entered, the CPU 21 ends the device data setting process without creating the device-setting item data.

Following the device-data setting process in S90, in S100, the CPU 21 reads the device-setting item data from the active directory 24 and specifies the unit of device data, in which the acquisition key is set. The CPU 21 transmits a request for the specified unit of device data to all of the printers 5 connected to the LAN 6. Thereafter, the CPU 21 may receive the specified unit of device data from one of the printers 5 connected to the LAN 6. Thus, the CPU 21 may acquire the specific unit of device data, in which the acquisition key is set. The CPU 21 may store the acquired unit of device data in the active directory 24.

For example, the device-data setting window W5 in FIG. 9 shows a case where the acquisition key identified by the text string #●●●# is being set to the IP address, which is one of the units of device data. In this case, the CPU 21 may transmit the request for the IP address to all of the printers 5 and acquire the IP address from one of the printers 5.

Figure 6:
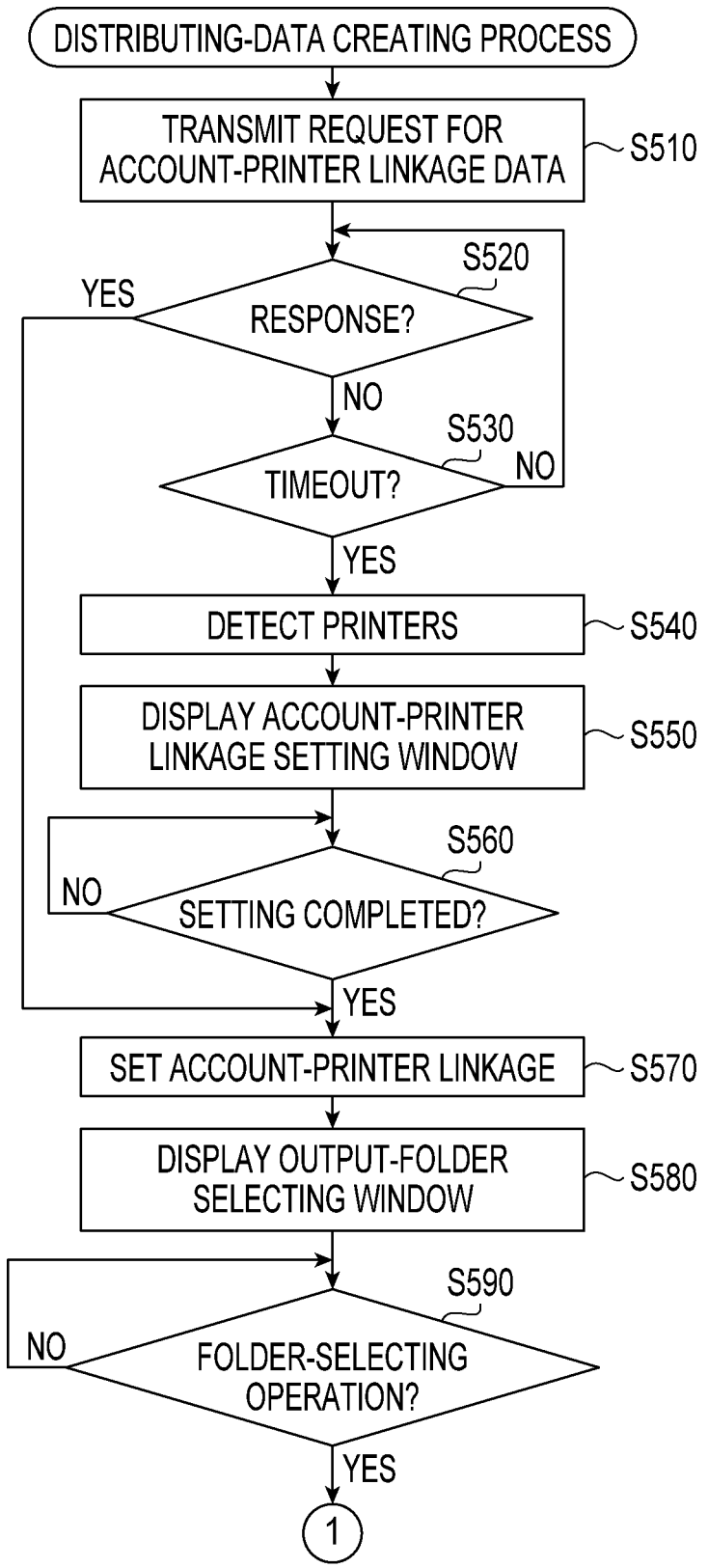
FIG. 6 is a flowchart to illustrate an earlier part of a flow of steps to be conducted in a distributing-data creating process according to the embodiment of the present disclosure.

Next, the distributing-data creating process in S120 will be described in detail. As the distributing-data creating process starts, in S510, as shown in FIG. 6, the CPU 21 transmits a request for account-printer linkage data to the active directory 24. The account-printer linkage data is a unit of data indicating linkage between each one of the plurality of accounts and one of the printers 5.

In S520, the CPU 21 determines whether a response from the active directory 24 is received. In particular, the CPU 21 may determine whether the account-printer linkage data is received from the active directory 24. In other words, the CPU 21 may determine that the response from the active directory 24 is received when the account-printer linkage data is received from the active directory 24.

If no response is received from the active directory 24, in S540, the CPU 21 determines whether a timeout period elapsed. In particular, the CPU 21 may determine that the timeout period elapsed when a predetermined length of time passed since the transmission of the request in S510.

If the timeout period has not elapsed, the CPU 21 returns to S520. If, on the other hand, the timeout period elapsed, in S540, the CPU 21 detects all of the printers 5 connected to the LAN 6. In particular, the CPU 21 may transmit a printer-search command to all of the printers 5 connected to the LAN 6. Thereafter, the CPU 21 may receive printer-identifying information including a printer registration name and an IP address from each of the printers 5 and thereby detect the printers 5.

In S550, the CPU 21 displays an account-printer linkage setting window W6 in the screen of the display interface 13. The account-printer linkage setting window W6 includes, as shown in FIG. 10, a linkage display area R51, a linkage setting area R52, and a save button B51.

The linkage display area R51 displays the accounts selected through the account-selecting window W3, each of which is linked with an account name, a name of the member, and a printer registration name.

The linkage setting area R52 is presented as a field, through which one of the accounts displayed in the linkage display area R51 may be linked with one of the printers 5. The linkage setting area R52 includes a printer entry button B52. The printer entry button B52 may be a pulldown button, and by an clicking operation to the printer entry button B52 through the mouse, a pulldown menu PM 1, which shows the printer registration names and the IP addresses of all of the printers 5 connected to the LAN 6, may be displayed as options, as illustrated by an arrow L1. The account-printer linkage setting window W6 in FIG. 10 illustrates a case where an account of a member whose name is VVV is being selected to be linked with one of the printers 5.

In S560, the CPU 21 determines whether linking of the accounts with the printers 5 is completed. In particular, the CPU 21 may determine whether a clicking operation to the save button B51 is entered and may determine that linking of the accounts with the printers 5 is completed when the clicking operation to the save button B51 is entered.

If linking of the accounts with the printers 5 is not completed, the CPU 21 repeats S560 to wait for the accounts to be linked with the printers 5. After linking the accounts with the printers 5 completely, the CPU 21 proceeds to S570.

Meanwhile, if, in S520, the response from the active directory 24 is received, the CPU 21 proceeds to S570. In S570, the CPU 21 sets linkage between the accounts and the printers 5 based on the contents of the account-printer linkage data received from the active directory 24 or the contents set through the account-printer linkage setting window W6.

Moreover, in S580, the CPU 21 displays an output-folder selecting window, through which an output folder may be selected, in the screen of the display interface 13. In S590, the CPU 21 determines whether a folder-selecting operation to select an output folder is entered. In particular, the CPU 21 may determine whether an input-operation information, which indicates an output folder selected through the output-folder selecting window, is entered. If the input-operation information indicating the output folder selected through the output-folder selecting window is entered, the CPU 21 may determine that the folder-selecting operation is entered.

Figure 7:
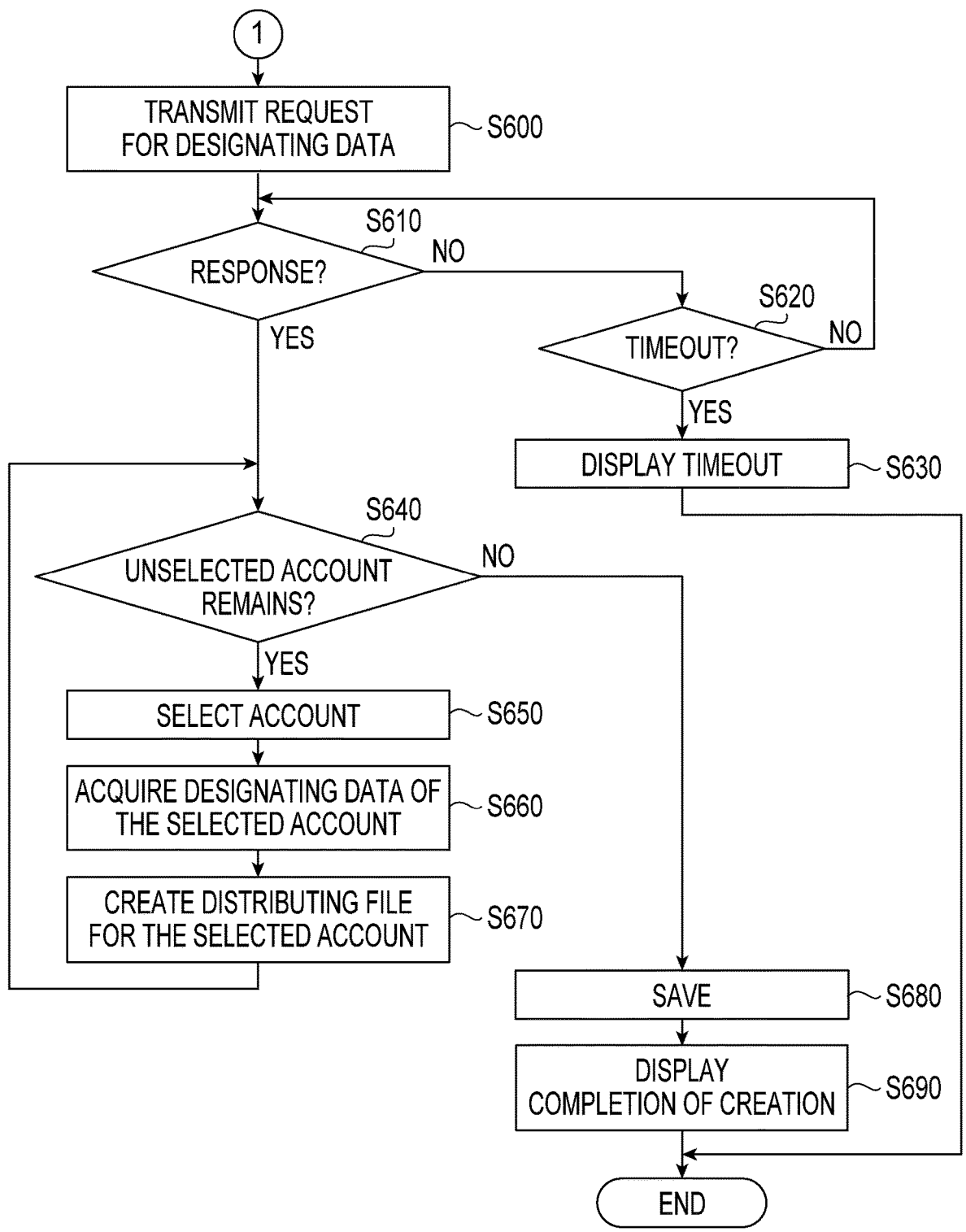
FIG. 7 is a flowchart to illustrate a later part of the flow of steps to be conducted in the distributing-data creating process according to the embodiment of the present disclosure.

If no folder-selecting operation is entered, the CPU 21 repeats S590 to wait for the folder-selecting operation to be entered. When the folder-selecting operation is entered, in S600, as shown in FIG. 7, the CPU 21 transmits a request for designating data of distribution-target accounts to the active directory 24. The distribution-target accounts are the accounts that are selected through the account-selecting window W3 and included in the selected-account data. The designating data includes units of account data, with which in the account-setting item data the acquisition keys are linked, among the units of account data of the distribution-target accounts. Moreover, the designating data includes units of device data, with which in the device-setting item data the acquisition keys are linked, among the units of device data of the printers 5 that are linked with the distribution-target accounts in S570.

In S610, the CPU 21 determines whether a response is received from the active directory 24. In particular, the CPU 21 determines whether the designating data of the distribution-target accounts from the active directory 24 is received. In other words, the CPU 21 determines that a response from the active directory 24 is received when the designating data of the distribution-target accounts is received from the active directory 24.

If no response is received from the active directory 24, in S620, the CPU 21 determines whether a timeout period elapsed. In particular, the CPU 21 may determine that the timeout period elapsed when a predetermined length of time passed since the transmission of the request in S600.

If the timeout period has not elapsed, the CPU 21 returns to S610. If, on the other hand, the timeout period elapsed, the CPU 21 displays a message indicating the timeout in the screen of the display interface 13 and ends the distributing-data creating process.

Meanwhile, in S610, if the response from the active directory 24 is received, in S640, the CPU 21 determines whether the distribution-target accounts include unselected distribution-target accounts that remain unselected in the process in S650, which will be described next. If the distribution-target accounts include unselected accounts, in S650, the CPU 21 selects one of the unselected distribution-target accounts.

In S660, the CPU 21 acquires the designating data of the distribution-target account selected in S650. In S670, the CPU 21 creates a distributing file for the distribution-target account selected in S650 by reflecting the designating data acquired in S660 in the distributing file selected in S30. The CPU 21 proceeds to S640.

For example, as shown in the distributing-file editing area R11 in the selected-file editing window W2 in FIG. 9, the text string "#●●●#" in "IP Address=#●●●#" in the distributing file is replaced with the IP address of the printer 5 linked with the distribution-target account. Moreover, the text string # ♦♦♦# in "Scan to Server Url=# #♦♦♦#" is replaced with the scan-saving server URL of the distribution-target account.

In S640, meanwhile, if there is no unselected distribution-target account, in S680, the CPU 21 saves the distributing files created in S670 to the selected output folder.

Moreover, in S690, the CPU 21 displays a message indicating that creation of the distributing files is completed in the screen of the display interface 13 and ends the distributing-data creating process.

(3) Benefits

The administration program 23 as described above may be used in the administration system 1, which may administrate one or more client devices 4.

The administration system 1 has one or more client devices 4, the administration device 2 to administrate the client devices 4, one or more printers 5, and the storage 15 that may store a plurality of units of account data concerning a user of each client device 4.

The administration program 23 may cause the controller 11 in the administration device 2 to acquire a designated one of the plurality of units of device data, which are set to the printer 5, from the printer 5. The designated one of the plurality of units of device data set to the printer 5 will herein be called as "device designating data."

Moreover, the administration program 23 may cause the controller 11 in the administration device 2 to acquire a designated one of the plurality of units of account data, which are created on the user basis, from the storage 15. In the following paragraphs, the designated one of the plurality of units of account data may herein be called as "account designating data."

Further, the administration program 23 may cause the controller 11 in the administration device 2 to reflect the acquired device designating data and the acquired account designating data in the distributing file to be delivered to the client device 4 of the user.

With the administration program 23 as described above, the administration device 2 may create the distributing files, in each of which the device designating data and the account designating data are reflected, for each of the client devices by acquiring the device designating data and the account designating data. Therefore, efficiency in creating distributing files may be improved.

The administration program 23 may cause the controller 11 to store the distributing files, in which the device designating data and the account designating data are reflected, in the active directory 24 that may deliver the distributing data to the client device 4. Thus, the administration program 23 may distribute the distributing files from the active directory 24 to the client devices 4.

The administration program 23 may cause the controller 11 to display the device-data setting window W5, through which designation of the device designating data among the plurality of units of device data is enabled, in the screen of the display interface 13. Moreover, the administration program 23 may cause the controller 11 to display the account-data setting window W4, through which designation of the account designating data among the plurality of units of account data is enabled, in the screen of the display interface 13.

The administration program 23 may cause the controller 11 to reflect the device designating data designated through the device-data setting window W5 and the account designating data designated through the account-data setting window W4 in the distributing file. Thus, the operations to be entered to the administration device 2, for designating the device designating data and the account designating data through the device-data setting window W5 and the account-data setting window W4, may be provided in the comprehensive manners to the administrator.

Although an example of carrying out the invention has been described, those skilled in the art will appreciate that there are numerous variations and permutations of the computer-readable storage medium, the administration method, and the administration system that fall within the spirit and the scope of the invention as set forth in the appended claims. It is to be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiments may merely be regarded as examples of the claimed subject matters.

For example, in the embodiment described above, the selected-file editing window W2 may be displayed in response to the clicking operation to the distributing-file setting button B1 in the editing-start window W1. Similarly, the account-data setting window W4 may be displayed in response to the clicking operation entered to the account-data setting button B2, and the device-data setting window W5 may be displayed in response to the clicking operation to the device-data setting button B3. For another example, as shown in FIG. 11, an edit-setting window W7 including a display area R61, a display area R62, and R63, which are equivalent to the selected-file editing window W2, the account-data setting window W4, and the device-data setting window R5, respectively, may be displayed.

For another example, the networking devices may not necessarily be limited to the printers 5 may include multifunction peripheral machines and/or copiers having a scanning function to read images of original materials, and facsimile machines.

For another example, a plurality of functions provided to a single element composing the embodiment described above may optionally be implemented by a plurality of elements, or a single function provided to a single element may optionally be implemented by a plurality of elements. For another example, a plurality of functions implementable by a plurality of elements may optionally be implemented by a single element, or a single function implementable by a plurality of elements may optionally be implemented by a single element. For another example, a part of the elements composing the embodiment described above may optionally be omitted. For another example, at least a part of the elements composing the embodiment described above may be added to or replaced with another part of the elements forming the embodiment described above.

The present disclosure may be implementable not only by the administration device 2 described above but also in forms of, for example, a system including the administration device 2, a non-transitory computer-readable storage medium storing computer-readable instructions to cause a computer to operate as the administration device 2, and a method to control a computer to operate as the administration device 2.

What is claimed is:

1. A non-transitory computer readable storage medium storing computer readable instructions that are executable by a computer in an administration system, the administration system comprising:
   a client device;
   an administration device configured to administrate the client device and comprising the computer;
   a device configured to operate based on commands from the client device; and a storage configured to store a plurality of units of user information concerning a user of the client device, the computer readable instructions, when executed by the computer, causing the computer to:

acquire device designating information from the device, the device designating information being a designated one of a plurality of units of device information set to the device, the designated one of the plurality of units of device information being provided with an acquisition key, the computer acquiring the device designating information among the plurality of units of device information based on the acquisition key;

acquire user designating information from the storage, the user designating information being a designated one of the plurality of units of user information set to the user, the designated one of the plurality of units of user information being provided with an acquisition key, the computer acquiring the user designating information among the plurality of units of user information based on the acquisition key; and reflect the acquired device designating information and the acquired user designating information in a distributing file to be delivered to the client device of the user.

2. The non-transitory computer readable storage medium according to claim 1, wherein the computer readable instructions, when executed by the computer, cause the computer to store the distributing file, in which the device designating information and the user designating information are reflected, in a distributable storage, the distributable storage being configured to deliver data to the client device.

3. The non-transitory computer readable storage medium according to claim 1, wherein the administration device comprises a display interface; and wherein the computer readable instructions, when executed by the computer, cause the computer to:

display a device information designating object, through which designation of the one of the plurality of units of device information is enabled, through the display interface;

display a user information designating object, through which designation of the one of the plurality of units of user information is enabled; and reflect the one of the plurality of units of device information designated through the device information designating object and the one of the plurality of units of user information designated through the user information designating object in the distributing file.

4. A method to be implemented by an administration device in an administration system, the administration system comprising:

a client device;

the administration device configured to administrate the client device;

a device configured to operate based on commands from the client device; and a storage configured to store a plurality of units of user information concerning a user of the client device;

the method comprising:

acquiring device designating information from the device, the device designating information being a designated one of a plurality of units of device information set to the device, the designated one of the plurality of units of device information being provided with an acquisition key, the device designating information being acquired among the plurality of units of device information based on the acquisition key;

acquiring user designating information from the storage, the user designating information being a designated one of the plurality of units of user information set to the user, the designated one of the plurality of units of user information being provided with an acquisition key, the user designating information being acquired among the plurality of units of user information based on the acquisition key; and reflecting the acquired device designating information and the acquired user designating information in a distributing file to be delivered to the client device of the user.

5. An administration system, comprising:

a client device;

an administration device configured to administrate the client device;

a device configured to operate based on commands from the client device; and a storage configured to store a plurality of units of user information concerning a user of the client device, wherein the administration device is configured to:

acquire device designating information from the device, the device designating information being a designated one of a plurality of units of device information set to the device, the designated one of the plurality of units of device information being provided with an acquisition key, the administration device acquiring the device designating information among the plurality of units of device information based on the acquisition key;

acquire user designating information from the storage, the user designating information being a designated one of the plurality of units of user information set to the user, the designated one of the plurality of units of user information being provided with an acquisition key, the administration device acquiring the user designating information among the plurality of units of user information based on the acquisition key; and reflect the acquired device designating information and the acquired user designating information in a distributing file to be delivered to the client device of the user.

6. A method to be implemented in an administration system, the administration system comprising:

a client device;

an administration device configured to administrate the client device;

a device configured to operate based on commands from the client device; and a storage configured to store a plurality of units of user information concerning a user of the client device;

the method comprising:

causing the administration device to acquire device designating information from the device, the device designating information being a designated one of a plurality of units of device information set to the device, the designated one of the plurality of units of device information being provided with an acquisition key, the device designating information being acquired among the plurality of units of device information based on the acquisition key;

causing the administration device to acquire user designating information from the storage, the user designating information being a designated one of the plurality of units of user information set to the user, the designated one of the plurality of units of user information being provided with an acquisition key, the user designating information being acquired among the plurality of units of user information based on the acquisition key; and causing the administration device to reflect the acquired device designating information and the acquired user designating information in a distributing file to be delivered to the client device of the user.

\* \* \* \* \*